United States Patent
Utsumi et al.

(10) Patent No.: US 8,879,030 B2
(45) Date of Patent: Nov. 4, 2014

(54) ACTIVE MATRIX TYPE LIQUID CRYSTAL DISPLAY APPARATUS WITH COMPLEMENTARY POLARIZER

(75) Inventors: Yuka Utsumi, Hitachi (JP); Katsumi Kondo, Mito (JP); Yasushi Tomioka, Hitachinaka (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1166 days.

(21) Appl. No.: 11/439,266

(22) Filed: May 24, 2006

(65) Prior Publication Data
US 2006/0268198 A1 Nov. 30, 2006

(30) Foreign Application Priority Data
May 25, 2005 (JP) ................... 2005-151764

(51) Int. Cl.
*G02F 1/1335* (2006.01)
*G02F 1/13363* (2006.01)

(52) U.S. Cl.
CPC *G02F 1/13363* (2013.01); *G02F 2001/133531* (2013.01); *G02F 1/133528* (2013.01); *G02F 2001/13356* (2013.01); *G02F 2413/01* (2013.01)
USPC .............................. 349/117; 349/96

(58) Field of Classification Search
USPC .................................... 349/96, 117
See application file for complete search history.

(56) References Cited

U.S. PATENT DOCUMENTS

| | | |
|---|---|---|
| 6,399,166 B1 | 6/2002 | Khan et al. |
| 2004/0070704 A1* | 4/2004 | Lazarev et al. ................ 349/96 |
| 2004/0085496 A1* | 5/2004 | Paukshto et al. ............. 349/106 |
| 2004/0105049 A1 | 6/2004 | Yeh et al. |
| 2004/0146663 A1* | 7/2004 | Paukshto et al. ............ 428/1.31 |

FOREIGN PATENT DOCUMENTS

| | | |
|---|---|---|
| CN | 1426542 | 6/2003 |
| WO | WO 01/81991 | 11/2001 |

* cited by examiner

*Primary Examiner* — Jessica M Merlin
(74) *Attorney, Agent, or Firm* — Antonelli, Terry, Stout & Kraus, LLP.

(57) ABSTRACT

A transmitting liquid crystal display apparatus includes a liquid crystal panel including a pair of substrates, a pair of polarizers arranged adjacent to the pair of substrates respectively, a liquid crystal layer held between the pair of substrates, and electrodes arranged on at least one of the pair of substrates and serving to apply an electric field to the liquid crystal layer; and a light source unit arranged external to the pair of substrates, in which each of the pair of polarizers has an absorption axis along with an extraordinary wave axis of molecules constituting the polarizers. In this apparatus, a dye layer having a disc-form molecular structure is arranged between the polarizer and the substrate, or adjacent to the polarizer in proximity to the viewer. The dye layer has a transmission axis along with the extraordinary wave axis of the disc-form molecular structure.

5 Claims, 12 Drawing Sheets

ACTIVE MATRIX TYPE LIQUID CRYSTAL DISPLAY APPARATUS WITH COMPLEMENTARY POLARIZER

CLAIM OF PRIORITY

The present application claims priority from Japanese application serial no. 2005-151764, filed on May 25, 2005, the content of which is hereby incorporated by reference into this application.

FIELD OF THE INVENTION

The present invention relates to liquid crystal display panels and liquid crystal display apparatuses each using a polarizer having an absorption axis along with an extraordinary wave axis, and a polarizer having a transmission axis along with the extraordinary wave axis.

BACKGROUND OF THE INVENTION

Although a cathode ray tube (CRT, also generally referred to as "Braun tube") has been a mainstream of display devices, liquid crystal displays have been used more and more, because they have less thickness and weight than CRT and can produce images with better quality.

Demands have been increasingly made to provide better color reproduction and higher contrast ratio with broadening applications of liquid crystal displays as monitors for desktop personal computers, monitors for printing or designing, and liquid crystal televisions. In particular, viewing angle characteristics in color reproduction and contrast ratio are very important in liquid crystal televisions which become popular after the beginning of high-definition television (HDTV) broadcasting. For example, to view a flat liquid crystal television at a corner of a living room at home, the flat liquid crystal television must have contrast ratio and chromaticity not changing at viewing angles within ±45 degrees.

The viewing angle characteristics of liquid crystal display apparatuses are derived from the viewing angle characteristics of polarizers comprising an oriented component of iodine or a dichroic dye, and the viewing angle characteristics of liquid crystal layers. As a possible solution to improve the viewing angle characteristics, an optical film showing a phase difference is generally used. As another possible solution, the techniques disclosed in PCT Japanese Translation Patent Publications No. 2001-504328 and No. 2003-532141 use an E-polarizer showing satisfactory characteristics at wide viewing angles.

Liquid crystal display apparatuses which give a display by the action of polarization have an inherent issue that their characteristics such as contrast ratio and chromaticity significantly vary depending on the viewing angle, due to anisotropy of polarizers and liquid crystal molecules. To solve this issue, an attempt has been made to compensate the viewing angle characteristics using a substantially transparent optical film having uniaxial or biaxial refractive anisotropy. This technique has been employed in most of liquid crystal display apparatuses typically used as liquid crystal televisions. According to this technique, however, compensation cannot be achieved homogenously at visible wavelengths, because the liquid crystal and optical film both have refractive-anisotropic chromatic dispersion (wavelength dispersion).

Taking a three-primary color display system as an example, a blue display, a green display, and a red display are produced by transmitted light at wavelengths of 420 to 490 nm, at wavelengths of 520 to 570 nm, and at wavelengths of 610 to 650 nm, respectively, while depending on the wavelengths of emitted light of a light source to be used. If a high priority is given to the viewing angle compensation in contrast ratio, the compensation is preferably optimized at wavelengths of about 550 nm at which the spectral luminous efficacy is high. Accordingly, the compensation is not sufficient at shorter wavelengths for producing a blue display and at longer wavelengths for producing a red display. This causes insufficient compensation of viewing angle in blue and red displays and invites problems such as coloring in a black display. If the compensation is optimized at wavelengths for a blue display so as to avoid the coloring, the viewing angle compensation at wavelengths for a red display further becomes out of optimum conditions, and thereby the coloring in a red display becomes more intensive. In addition, the contrast ratio varies more significantly depending on the viewing angle, because the optimization is not achieved at a wavelength of 550 nm at which the spectral luminous efficacy is high. In contrast, if the viewing angle compensation is optimized at wavelengths for a red display, coloring in a blue display and the dependency of the contrast ratio on the viewing angle become more significant.

As another possible solution, a film showing reciprocal dispersion is used as an optical film for compensation. The film has refractive-anisotropic wavelength dispersion characteristics that decreases with a decreasing wavelength, which is opposite to regular optical film. This technique, however, has a narrow margin in design of materials for the optical film. Additionally, it cannot easily compensate large screens as in liquid crystal televisions, because the compensation is out of optimum conditions when the thickness of the liquid crystal layer locally varies as in such large screens.

In the above-mentioned technique, an E-polarizer having a disc-form molecular structure is configured to have a transmission axis along with an extraordinary wave axis and is used as a polarizing layer having wide viewing angle characteristics. According to this technique, however, the polarizing layer has a lower dichroic ratio and thereby shows a lower front contrast ratio than a polarizer comprising iodine or a rod-like dichroic dye oriented and having an absorption axis along with the extraordinary wave axis.

SUMMARY OF THE INVENTION

The present invention provides a liquid crystal display apparatus comprising:

a pair of substrates;

a pair of polarizers each being disposed to the pair of substrates respectively;

a liquid crystal layer held between the pair of substrates; and a group of electrodes being disposed to at least one of the pair of substrates and serving to apply an electric field to the liquid crystal layer, wherein each of the pair of polarizers has an absorption axis along with an extraordinary wave axis of molecules constituting the polarizer, wherein at least one of the pair of substrates carries a dye layer having a disc-form molecular structure and having a transmission axis along with the extraordinary wave axis of molecules, and wherein the dye layer has a transmission axis in substantial parallel with the transmission axis of one of the pair of polarizers in proximity to the dye layer. proximityproximityproximityproximityproximityproximityproximityproximity proximit yproximityproximityproximityproximity

DESCRIPTION OF THE PREFERRED EMBODIMENTS

It may be an object of embodiments of the present invention is to solve the problem in, length dependency in the conventional technique of carrying out the compensation using an optical film showing a phase difference and containing an oriented component of iodine or rod-like dichroic dye. It may be another object of embodiments of the present invention is to avoid decrease in contrast ratio in the technique of using the dye layer having a disc-form molecular structure. To achieve these objects, one aspect of the present invention uses, as a viewing angle compensation device in a liquid crystal display apparatus, a layer which contains a dye layer having a disc-form molecular structure and having a transmission axis along with an extraordinary wave axis. Specifically, the layer herein is configured as a very thin film so as to have a high transmittance. Hereinafter this layer is referred to as an "E-compensator" for compensating viewing angle of the liquid crystal display apparatus. A polarizing layer containing an oriented component of iodine or a rod-like dichroic dye is referred to as an "O-polarizer".

The definition of wave axes in the E-compensator differs from that of a polarizer having a very high degree of polarization. Specifically, a wave axis having a higher transmittance is defined as a transmission axis, and a wave axis having a lower transmittance is defined as an absorption axis in the E-compensator.

The alignment of molecular structure of the E-compensator is specified by determining Bragg angles of X-ray diffraction peaks when X-rays are applied from the transmission axis, i.e., the extraordinary wave axis of the E-compensator and when X-rays are applied from the absorption axis, i.e., the ordinary wave axis thereof.

Figure 1:
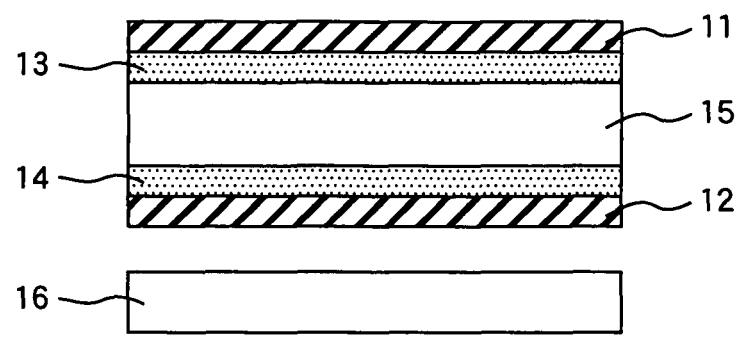
FIG. 1 is a schematic sectional view showing the configuration of a liquid crystal display apparatus as an embodiment of the present invention.

To achieve the above-mentioned objects, the present invention provides, for example, a configuration in which an E-compensator is arranged in external to a pair of O-polarizers, and the transmission axis of the E-compensator is arranged in substantial parallel with the transmission axis of a most proximity O-polarizer. The configuration will be illustrated with reference to FIG. 1. The term "external to the O-polarizers" means as follows. When the configuration of a liquid crystal panel held between a pair of O-polarizers is viewed from a light source and from a viewer, the "external to the O-polarizers" refers to opposite directions to the liquid crystal panel, namely, it refers to a direction toward the light source unit with respect to the O-polarizer in proximity to the light source unit, and a direction toward the viewer with respect to the O-polarizer in proximity to the viewer. Consequently, with reference to FIG. 1, the transmission axis of an E-compensator 11 in proximity to the viewer is arranged in substantial parallel with the transmission axis of an O-polarizer 13, and the transmission axis of an E-compensator 12 in proximity to the light source is arranged in substantial parallel with the transmission axis of an O-polarizer 14. The phrase "in substantial parallel" is used, because the E-compensators have wider margins in transmission axis than that of the O-polarizers and have margins of several degrees. When E-compensators are arranged external to a pair of O-polarizers as in the configuration of FIG. 1, the two E-compensators have transmission axes perpendicular to each other, as in the O-polarizers. This configuration results in improved viewing angle characteristics in contrast ratio in the absorption axes of the upper and lower E-compensators. The configuration can also significantly reduce the luminance of a black display and increases the front contrast ratio, because it also acts complementarily on the degree of polarization of O-polarizers, in addition to compensation of viewing angle.

Figure 2:
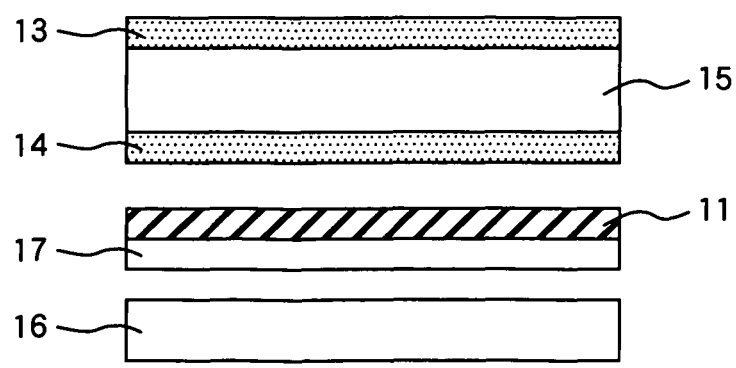
FIG. 2 is a schematic sectional view showing the configuration of a liquid crystal display apparatus as another embodiment of the present invention.

In another configuration, an E-compensator is arranged external to one of a pair of O-polarizers, and the transmission axis of the E-compensator is arranged in substantial parallel with the transmission axis of a most proximity O-polarizer. This configuration will be illustrated with reference to FIG. 2. FIG. 2 shows a configuration in which an E-compensator 11 is arranged external to an O-polarizer 14 in proximity to the light source. The E-compensator 11 herein is arranged adjacent to a diffuser 17 which constitutes a part of a light source unit 16. The E-compensator 11 has a transmission axis in substantial parallel with the transmission axis of the O-polarizer 14. According to this configuration, the viewing angle characteristic of contrast ratio is improved in a direction of the absorption axis of the E-compensator 11, i.e., in a direction perpendicular to the transmission axis of the E-compensator 11. The directions of the transmission axes can be set as appropriate. Namely, each of the transmission axes can locate in a horizontal direction, a perpendicular direction or an oblique direction when viewed from the viewer. In the configuration of FIG. 2, the E-compensator is arranged adjacent to the diffuser of the light source unit, but the same advantages can be obtained when the E-compensator is arranged adjacent to the O-polarizer 14.

Figure 3:
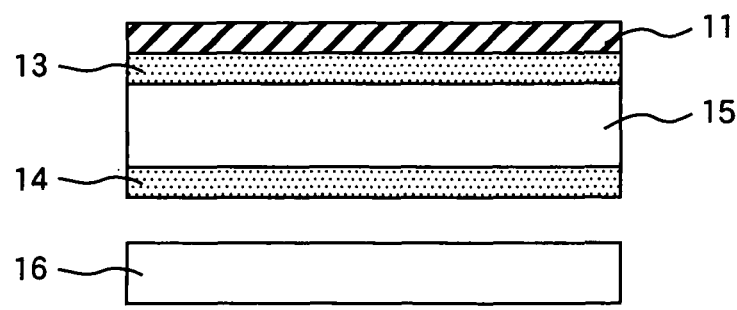
FIG. 3 is a schematic sectional view showing the configuration of a liquid crystal display apparatus as yet another embodiment of the present invention.

In yet another configuration, an E-compensator 11 is arranged external to an O-polarizer 13 that is in proximity to the viewer, as is illustrated in FIG. 3. The E-compensator 11 has a transmission axis in substantial parallel with the transmission axis of the O-polarizer 13. According to this configuration, the viewing angle characteristic of contrast ratio is improved in a direction of the absorption axis of the E-compensator 11, i.e., in a direction perpendicular to the transmission axis of the E-compensator 11. The directions of the transmission axes can be set as appropriate. Namely, each of the transmission axes can locate in a horizontal direction, a perpendicular direction or an oblique direction when viewed from the viewer. In the configuration of FIG. 3, the E-compensator is arranged adjacent to the O-polarizer 13. The same advantages, however, can be obtained when the E-compensator is arranged adjacent to a protector such as glass or an acrylic plate, which may be arranged external to the O-polarizer. In this case, the E-compensator can be arranged adjacent to either side of the protector, namely to a side facing the viewer or a side facing the liquid crystal panel.

Figure 4:
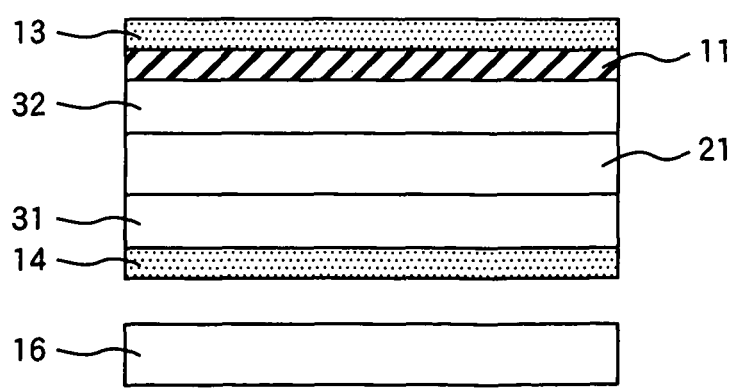
FIG. 4 is a schematic sectional view showing the configuration of a liquid crystal display apparatus as still another embodiment of the present invention.

In still another configuration, an E-compensator is arranged between (in internal to) a pair of o-polarizers. This configuration will be illustrated with reference to FIG. 4. In this configuration, an E-compensator 11 is arranged between an O-polarizer 13 and a liquid crystal layer 21. In the configuration of FIG. 4, the E-compensator 11 is arranged between a substrate 32 and the O-polarizer 13, but it can be arranged between the substrate 32 and the liquid crystal layer 21. In the former case, the E-compensator 11 can be arranged adjacent to the substrate 32 or adjacent to the O-polarizer 13. In the latter case, the E-compensator 11 can be arranged adjacent to a color filter (not shown) or an alignment layer (not shown) each arranged adjacent to the substrate 32. In a display apparatus in which a liquid crystal display is achieved by applying an electric field in a vertical direction, the E-compensator 11 can be arranged adjacent to a transparent electrode (not shown) or between the transparent electrode and a color filter. The transmission axis of the E-compensator 11 is arranged in substantial parallel with the transmission axis of the O-polarizer 13. According to this configuration, the contrast ratio can be increased not only in a direction of the absorption axis but also in the transmission axis and in oblique directions of the E-compensator. It is important in this configuration to reduce the thickness of the E-compensator. Specifically, the E-compensator is arranged between a pair of O-polarizers, and derangement of molecular alignment of the E-compensator causes light leakage in a black display. By reducing the thickness of the E-compensator, the degree of orientation of molecules increases. The degree of orientation and the thickness can be set in an optimal manner. When a color filter layer is arranged between an E-compensator and an O-polarizer, the light leakage due to scattering by the color filter layer can be reduced to thereby yield a better contrast ratio.

Figure 5:
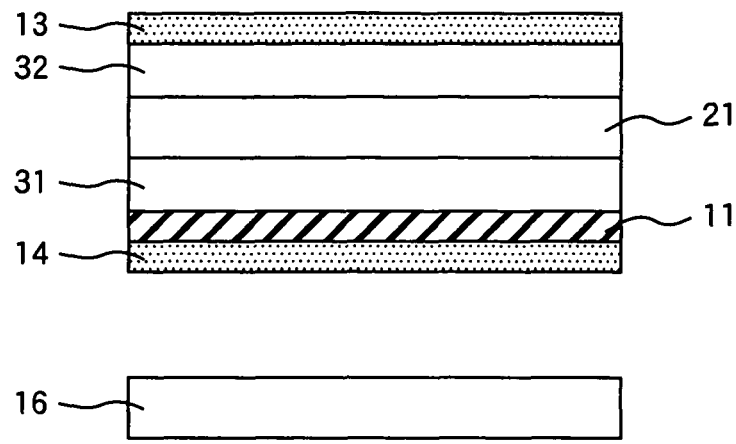
FIG. 5 is a schematic sectional view showing the configuration of a liquid crystal display apparatus as another embodiment of the present invention.

In another configuration, an E-compensator is arranged between a liquid crystal layer and an O-polarizer in proximity to the light source. This configuration will be illustrated with reference to FIG. 5. In this configuration, an E-compensator 11 is arranged between an O-polarizer 14 and a liquid crystal layer 21. In the configuration of FIG. 5, the E-compensator 11 is arranged between a substrate 31 and the O-polarizer 14, but the E-compensator 11 can also be arranged between the substrate 31 and the liquid crystal layer 21. In the former case, the E-compensator 11 can be arranged adjacent to the substrate 31 or to the O-polarizer 14. In the latter case, the E-compensator 11 can be arranged adjacent to an alignment layer (not shown) or between the alignment layer and an electrode (not shown). When a color filter is arranged adjacent to the substrate 31, the E-compensator 11 is preferably arranged between the color filter and the liquid crystal layer 21. This reduces scattering by the color filter to thereby improve the contrast ratio. The transmission axis of the E-compensator 11 is arranged in substantial parallel with the transmission axis of the O-polarizer 14. According to this configuration, the contrast ratio can be increased not only in the absorption axis but also in the transmission axis of the E-compensator and in oblique directions. It is important in this configuration to reduce the thickness of the E-compensator. Specifically, the E-compensator is arranged between a pair of O-polarizers, and derangement of molecular alignment of the E-compensator causes light leakage in a black display. By reducing the thickness of the E-compensator, the degree of orientation of molecules increases. The degree of orientation and the thickness can be set in an optimal manner.

In yet another configuration, an E-compensator is arranged external to one of a pair of O-polarizers, and the transmission axis of the E-compensator is arranged in substantial parallel with the absorption axis of a most proximity O-polarizer. This configuration will be illustrated with reference to FIG. 2, in which an E-compensator 11 is arranged external to an O-polarizer 14 in proximity to the light source. The E-compensator 11 herein is arranged adjacent to a diffuser 17 which constitutes a part of a light source unit 16. The E-compensator 11 has a transmission axis in substantial parallel with the absorption axis of the O-polarizer 14. According to this configuration, the contrast ratio can be increased not only in the absorption axis but also in the transmission axis of the E-compensator and in oblique directions. In the configuration of FIG. 2, the E-compensator is arranged adjacent to the diffuser of the light source unit, but the same advantages can be obtained when it is arranged adjacent to the O-polarizer 14. It is important to form the E-compensator as a thin film in this configuration, because the transmission axis is in substantial parallel with the absorption axis. Specifically, the transmittance of a white display of the liquid crystal display apparatus can be prevented from decreasing by minimizing the absorption in the absorption axis of the E-compensator. If such an E-compensator is allowed to act as a polarizer as in conventional techniques the transmittance of the white display significantly decreases. The present invention allows the layer to act as a viewing-angle compensator and thereby realizes well-balanced optical characteristics.

In still another configuration, an E-compensator 11 is arranged external to an O-polarizer 13 in proximity to the viewer, as is illustrated in FIG. 3. The E-compensator 11 has a transmission axis in substantial parallel with the absorption axis of the O-polarizer 13. According to this configuration, the contrast ratio can be increased not only in the absorption axis but also in the transmission axis of the E-compensator and in oblique directions. In the configuration of FIG. 3, the E-compensator is arranged adjacent to the O-polarizer 13. The same advantages can be obtained when the E-compensator is arranged adjacent to a protector such as glass or an acrylic plate which may be arranged external to the O-polarizer. In this case, the E-compensator can be arranged adjacent to either side of the protector, namely on a side facing the viewer or a side facing the liquid crystal panel. It is important to form the E-compensator as a thin film in this configuration, because the transmission axis is in substantial parallel with the absorption axis.

Specifically, the transmittance in white displays of the liquid crystal display apparatus can be prevented from decreasing by minimizing the absorption in the absorption axis of the E-compensator. If such an E-compensator is allowed to act as a polarizer as in conventional configurations, the transmittance in white displays significantly decreases. The present invention allows the layer to act as viewing-angle compensator and thereby realizes well-balanced optical characteristics.

As a specific method for preparing an E-compensator, a method for forming a polarizer by applying a lyotropic liquid crystalline dichroic dye using shear stress to thereby from a film. Specific examples of the lyotropic liquid crystalline dichroic dye can be found in PCT International Publication No. WO 97/39380. More specific examples include compounds imparted with water-solubility by sulfonation of polycyclic compounds such as indathrone derivatives, dibenzimidazole derivatives of perylenetetracarboxylic acid, and naphthalenetetracarboxylic acid derivatives (PCT Japanese Translation Patent Publication No. 08-511109). Materials for use herein are not limited to the above examples, as long as they have a disc-form molecular structure, can absorb ordinary wave and transmit extraordinary wave, and can improve the viewing angle characteristics of O-polarizers that absorb extraordinary wave and transmit ordinary wave. For example, a dichroic dye showing chromonic mesophase can be used for applying the material to form a thin film by the action of shear stress. Likewise, a lyotropic liquid crystal layer may be oriented by applying polarized ultraviolet rays to a photo-reactive polymer to thereby control the alignment of molecules. The E-compensator can also be formed by adding a photo-crosslinkable functional group to a disc-form molecular structure, and applying polarized ultraviolet rays to thereby control the alignment and to crosslink the molecules.

It is important to reduce the thickness of the E-compensators for use in the present invention. This is because a dye layer showing absorption in visible wavelengths is used as a compensator for the viewing angle, and thereby the E-compensator must have a high transmittance. After investigations, the present inventors have found that the transmittance is preferably 80% or more so as not to impair the luminance in a white display, when two E-compensators are arranged, each of which has a transmission axis in substantial parallel with the transmission axis of a most proximity O-polarizer. The transmittance is practically preferably 70% or more when one E-compensator is arranged adjacent to one of two O-polarizers. The transmittance of the E-compensator is preferably 90% or more when the transmission axis of the E-compensator is arranged in substantial parallel with the absorption axis of the O-polarizer. To ensure such a high transmittance, each of these E-compensators should have a small thickness, i.e. 50 to 250 nm. Especially when a thin film of an E-compensator is to be arranged inside two O-polarizers, the thin film is preferably formed by using shear stress or by applying polarized ultraviolet rays, because these techniques can improve the degree of orientation of molecules.

According to the present invention, the viewing angle characteristics of polarizers containing an oriented component of iodine or a rod-like dichroic dye and transmitting ordinary wave in liquid crystal display apparatuses can be compensated and thereby the viewing angle characteristics of the liquid crystal display apparatuses can be improved.

Further objects, features and advantages of the present invention will become apparent from the following description of the preferred embodiments with reference to the attached drawings.

Preferred embodiments of the present invention will be illustrated with reference to FIGS. 1 to 20.

Embodiment 1

A first embodiment (Embodiment 1) of the present invention will be illustrated with reference to the drawings.

Figure 6:
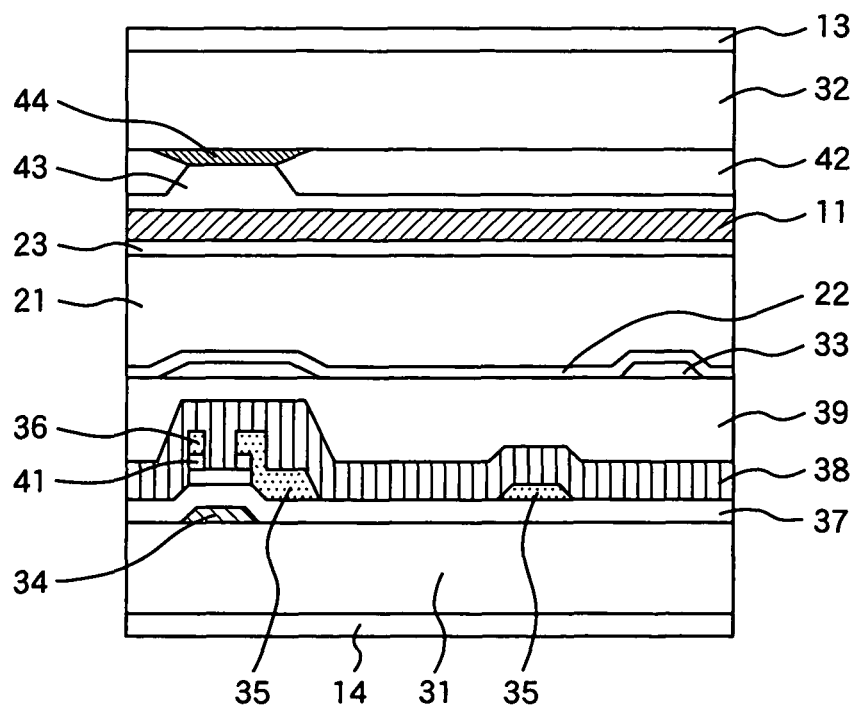
FIG. 6 is a schematic sectional view showing the vicinity of a pixel of the liquid crystal display apparatus as the embodiment of the present invention.
Figure 7:
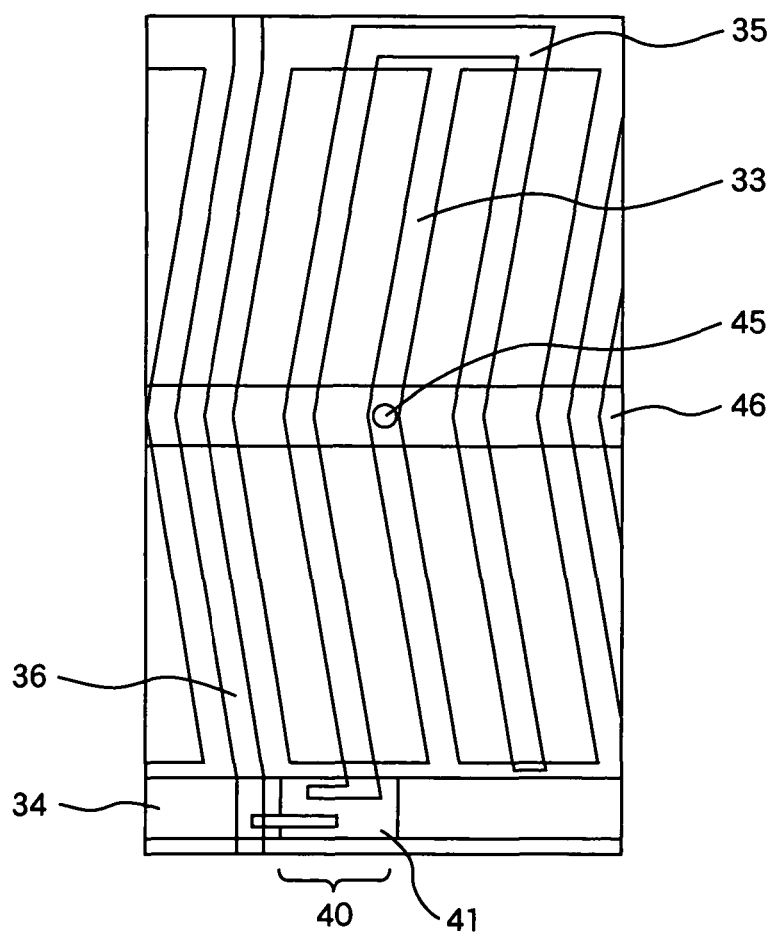
FIG. 7 is a schematic sectional view showing the vicinity of a pixel of an active matrix substrate of the liquid crystal display apparatus as the embodiment of the present invention.
Figure 8:
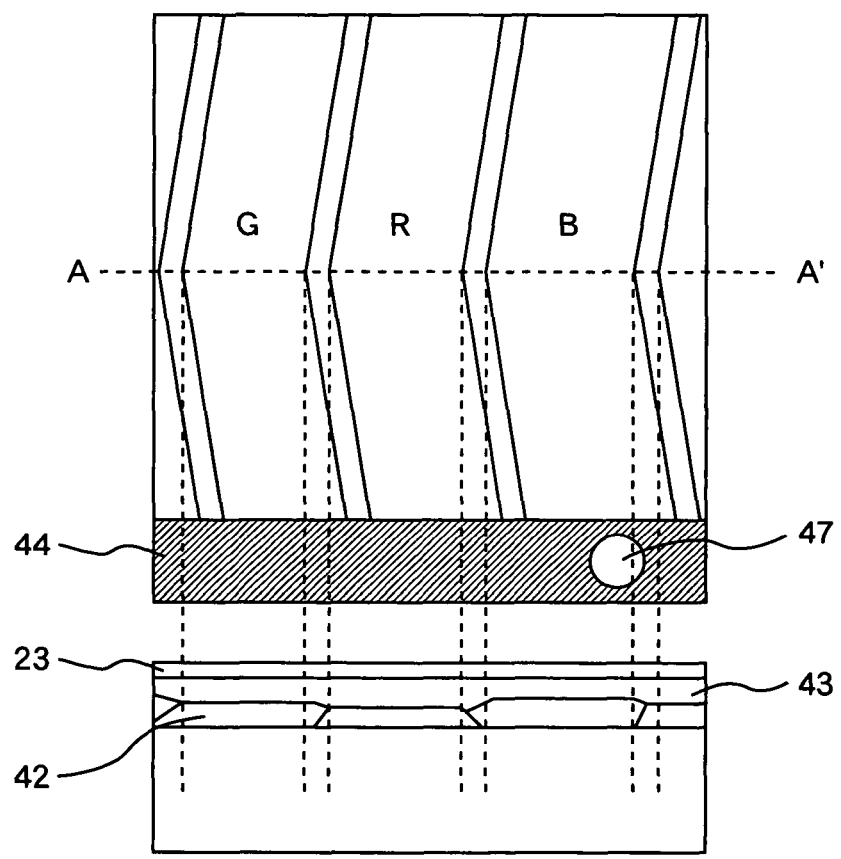
FIG. 8 is a schematic sectional view showing the vicinity of a pixel of a color filter of the liquid crystal display apparatus as the embodiment of the present invention.

The production of a liquid crystal display apparatus as Embodiment 1 of the present invention will be described with reference to FIGS. 2, 6, 7, and 8. FIGS. 6, 7, and 8 are schematic sectional views showing the vicinity of a pixel, the vicinity of a pixel of an active matrix substrate, and the vicinity of a picture element (comprising pixels of three primary colors, i.e., R, G, and B pixels in Embodiment 1) of a color filter, respectively, of the liquid crystal display apparatus as the embodiment of the present invention.

Non-alkali glass 0.7 mm thick was used as a substrate 31 constituting an active matrix substrate, and a substrate 32 constituting a color filter substrate. A thin-film transistor 40 to be formed on the substrate 31 comprises a pixel electrode 35, a signal electrode 36, a scanning electrode 34, and a semiconductor layer 41. The scanning electrode 34 was formed by patterning an aluminum film. A common interconnection 46 and the signal electrode 36 were formed by patterning a chromium film. The pixel electrode 35 was formed by patterning an indium tin oxide (ITO) film. The other components than the scanning electrode 34 were patterned as electrode interconnections in a staggered format at an angle of 10 degrees. The materials for these electrodes are not limited to the above-exemplified materials. For example, ITO is used as a material for the pixel electrode 35 herein, but any optically transparent conductive material, such as indium zinc oxide (IZO) or an inorganic transparent conductive material, can be used. Likewise, materials for metal electrodes are not limited. A gate dielectric film 37 and a protecting dielectric film 38 were made from silicon nitride to a thickness of 0.3 µm, respectively. Next, a cylindrical through hole 45 having a diameter of about 10 µm was formed up to the common interconnection 46 by photolithography and etching, an acrylic resin was applied thereto and was heated at 220° C. for one hour to yield an optically transparent, insulative interlayer dielectric film 39 having a thickness of about 3 µm and a dielectric constant of about 4.

Next, the through hole was etched again to a diameter of about 7 µm, and an ITO film was deposited and patterned thereon to form a common electrode 33 to be connected with the common interconnection 46. In this procedure, the distance between the pixel electrode 35 and the common electrode 33 was set at 7 µm. The common electrode 33 was formed to a thickness of about 80 mm in a grid-like manner so as to cover the signal electrode 36, the scanning electrode 34, and the thin-film transistor 40 and to surround pixels. Thus, an active matrix substrate comprising 1024×3 (corresponding to R, G, and B) signal electrodes 36 and 768 scanning electrodes 34 was produced.

Next, a black matrix was formed on the substrate 32 according to a conventional photolithographic procedure including the steps of application (coating), pre-baking, exposure, development, rinsing, and post-baking using a black resist as a product of Tokyo Ohka Kogyo Co., Ltd. The thickness of the black matrix is set at 1.5 µm in Embodiment 1, but it can be set as appropriate according to a black resist to be used, so as to have an optical density (OD) of about 3 or more. The black matrix herein comprises a black resist, but it may comprise a metal layer. Next, color filters were formed according to a conventional photolithographic procedure including the steps of application, pre-baking, exposure, development, rinsing, and post-baking using red, blue, and green resists as products of FUJIFILM Electronic Materials Co., Ltd. In Embodiment 1, the blue, green, and red color filters have thickness of 3.0 µm, 2.8 µm, and 2.7 µm, respectively, but the thickness can be set as appropriate according to desired color purities or the thickness of the liquid crystal layer. The color filter layers were formed according to a conventional photolithographic procedure in Embodiment 1, but they can be formed by another procedure such as printing, ink-jetting, or dry film formation. Next, an overcoat layer 43 was formed using a product of Nippon Steel Chemical Co., Ltd. under the trade name of V-259 so as to smoothen and protect the color filter layers. The overcoat layer 43 was formed by applying i-ray of a high-pressure mercury lamp at an irradiation energy of 200 mJ/cm$^2$ and heating at 200° C. for thirty minutes. The thickness of the resulting layer over a pixel was about 1.2 to 1.5 µm. Next, columnar spacers were formed to a height of about 3.8 µm on the black matrix sandwiched between blue pixels by conventional photolithography and etching using a photo-sensitive resin. The position of the columnar spacers is not limited to that described in Embodiment 1 and can be freely set according to necessity. Instead of the columnar spacers, spherical ball spacers can be selectively arranged typically by printing or ink-jetting. In Embodiment 1, the black matrix is formed in a region overlying the scanning electrode 34 of the TFT substrate, and spaces between adjacent pixels of different colors are formed so as to allow the adjacent different colors to overlap with each other. However, the black matrix can also be formed in spaces between adjacent pixels of different colors.

Alignment layers 22 and 23 comprising a dense polyimide film about 100 nm thick were formed by forming a polyamic acid varnish film on each of the TFT substrate and the color filter substrate by printing, carrying out a heat treatment at 210° C. for thirty minutes. The alignment layers were then subjected to rubbing. Materials for the alignment layers herein are not limited and include polyimides formed from pyromellitic acid dianhydride as an acid anhydride component, and polyimides formed from p-phenylenediamine or diaminodiphenylmethane as an amine component and an aliphatic tetracarboxylic acid dianhydride or pyromellitic acid dianhydride as an acid anhydride component. The alignment layers were aligned (oriented) by rubbing in Embodiment 1, but such alignment layers can also be formed by applying polarized ultraviolet rays to a photo-sensitive material for alignment layers. The liquid crystal molecular orientation was set in a direction of short side of the substrate (in a direction of signal electrode in the case of the TFT substrate).

Next, a liquid crystal display panel to constitute a liquid crystal display apparatus was assembled by arranging the two substrates so that the sides carrying the alignment layers 22 and 23 having liquid crystal alignment capability face each other, and applying a sealing agent to peripheries of the substrates. A nematic liquid crystal composition having a positive dielectric anisotropy of 10.2 at 1 kHz and 20° C. and a refractive anisotropy of 0.075 at a wavelength of 590 nm and 20° C. was filled into the panel in vacuo, and the filling port was sealed by an end-sealing material comprising an ultraviolet-curable resin.

Two O-polarizers 13 and 14 were applied to the liquid crystal panel. The O-polarizers are regular O-polarizer layers each comprising an O-polarizer and triacetylcelulose layers arranged adjacent to both sides of the O-polarizer, which O-polarizer was prepared by drawing or orienting a poly (vinyl alcohol) dyed with iodine. The transmission axis of the O-polarizer 14 was arranged in a longitudinal direction of the liquid crystal panel (in a direction of the scanning electrode), and the transmission axis of the O-polarizer 13 was arranged perpendicular to the former transmission axis. Components such as driving circuitry and a light source unit were connected to form a liquid crystal module to thereby yield a liquid crystal display apparatus. The light source unit used three-band fluorescent lamps as a light source. Specifically, twelve fluorescent lamps were arranged in the light source unit, and three layers comprising a diffusing film, a diffuser, and a diffusing film were arranged adjacent to the light source. An E-compensator was formed adjacent to the uppermost diffusing film. The E-compensator was formed by sulfonating a polycyclic compound such as an indathrone derivative, a dibenzimidazole derivative of perylenetetracarboxylic acid, or a naphthalenetetracarboxylic acid derivative to yield a lyomesophase exhibiting a chromonic phase, applying the lyomesophase using shear strength, drying, desulfonating the film with barium chloride, and insolubilizing the film. The E-compensator had a thickness of 140 nm after drying and a transmittance of 77%. The transmission axis of the E-compensator was arranged in substantial parallel with the transmission axis of the O-polarizer 14, namely, a direction of the long side of the diffuser (liquid crystal panel). The configuration of the liquid crystal display apparatus according to Embodiment 1 is schematically shown in FIG. 2.

Figure 9:
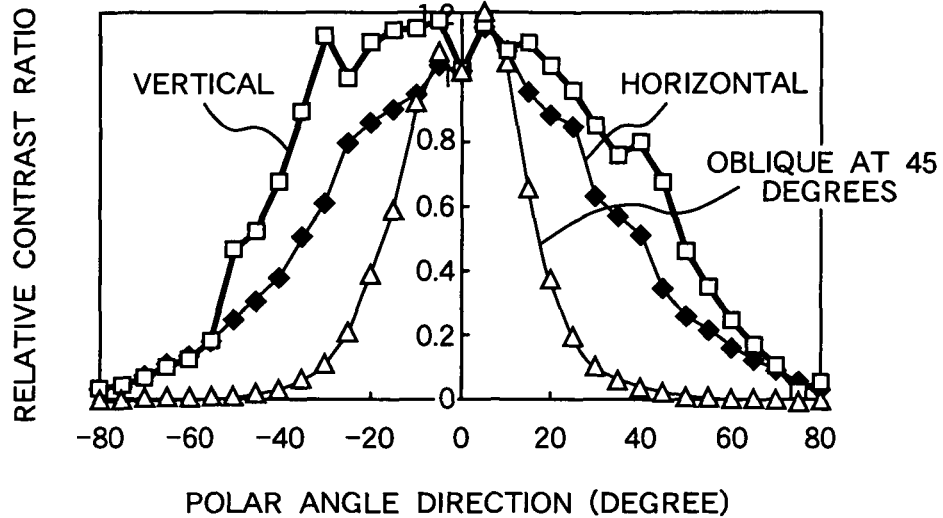
FIG. 9 shows the viewing angle characteristic in contrast ratio of a liquid crystal display apparatus as an embodiment of the present invention.

FIG. 9 shows the viewing angle characteristic in relative contrast ratio of the liquid crystal display apparatus according to Embodiment 1, showing how the front contrast ratio varies depending on the viewing angle. The "VERTICAL" is a short-side direction, and the "HORIZONTAL" is a long-side direction of the liquid crystal panel. The "OBLIQUE AT 45 DEGREES" is a direction at an angle of 45 degrees, wherein the horizontal right-hand direction viewed from the viewer is defined at 0 degree. Accordingly, directions at negative angles with respect to the polar angle are directions from 0 degree to 225 degrees. FIG. 9 demonstrates that the viewing angle characteristic is improved in the vertical direction as compared with the results of the comparative example shown in FIG. 10. Specifically, the viewing angle characteristic is improved in the direction of the absorption axis of the E-compensator. The liquid crystal display apparatus according to Embodiment 1 had an absolute value of the front contrast ratio of 700, higher than that of the comparative example. It also realized very satisfactory viewing angle characteristic in a black display without coloring.

The advantages of E-compensator for viewing angle compensation according to the present invention are not affected by the configuration and shape of liquid crystal display apparatuses, and the configuration is not limited to that of the liquid crystal display apparatus according to Embodiment 1.

Comparative Example

Figure 10:
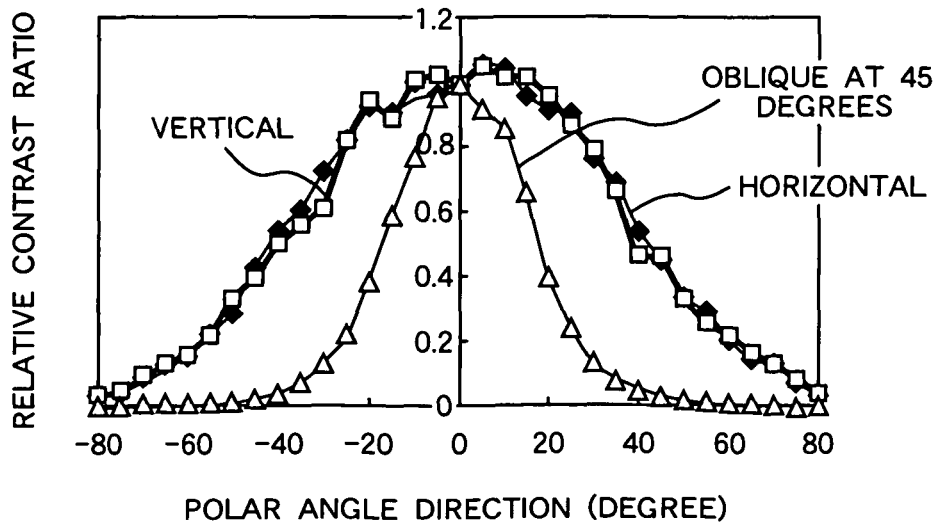
FIG. 10 shows the viewing angle characteristic in contrast ratio of a liquid crystal display apparatus as a comparative example.

A liquid crystal display apparatus was prepared by the procedure of Embodiment 1, except that an E-compensator was not formed on a diffuser in a light source unit. FIG. 10 shows the relative contrast ratio of the liquid crystal display apparatus. This liquid crystal display apparatus had a an absolute value of front contrast ratio of 600. It shows substantially same characteristics as the viewing angle characteristics of the O-polarizer.

Embodiment 2

Figure 11:
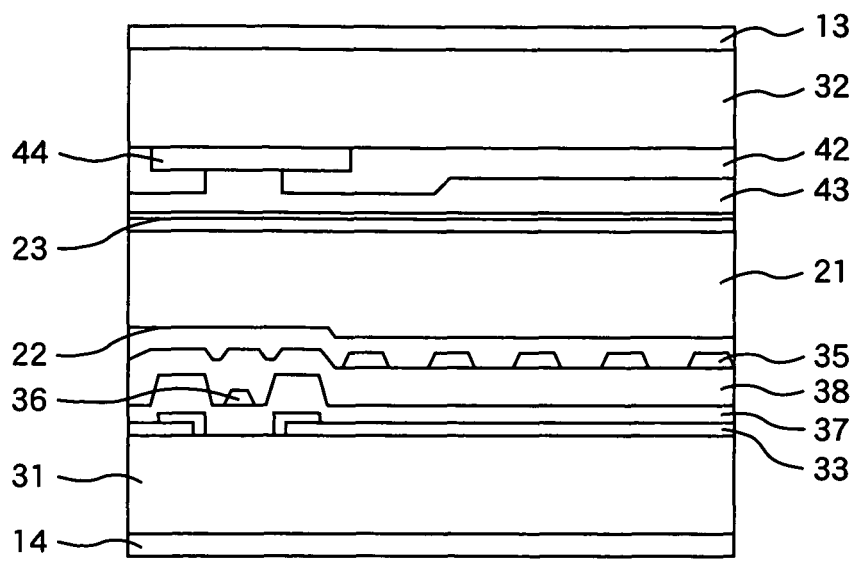
FIG. 11 is a schematic sectional view showing the vicinity of a pixel of a liquid crystal display apparatus as an embodiment of the present invention.
Figure 12:
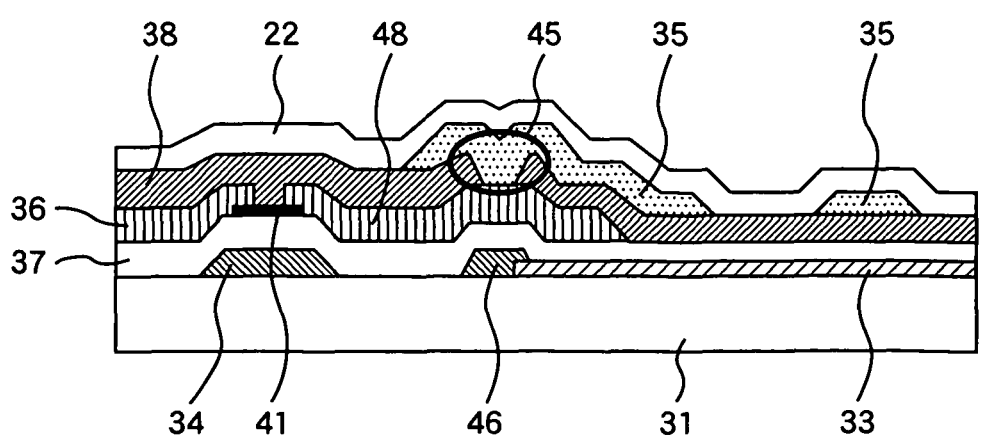
FIG. 12 is a schematic sectional view of the configuration of a thin-film transistor of an active matrix substrate of the liquid crystal display apparatus as the embodiment of the present invention.
Figure 13:
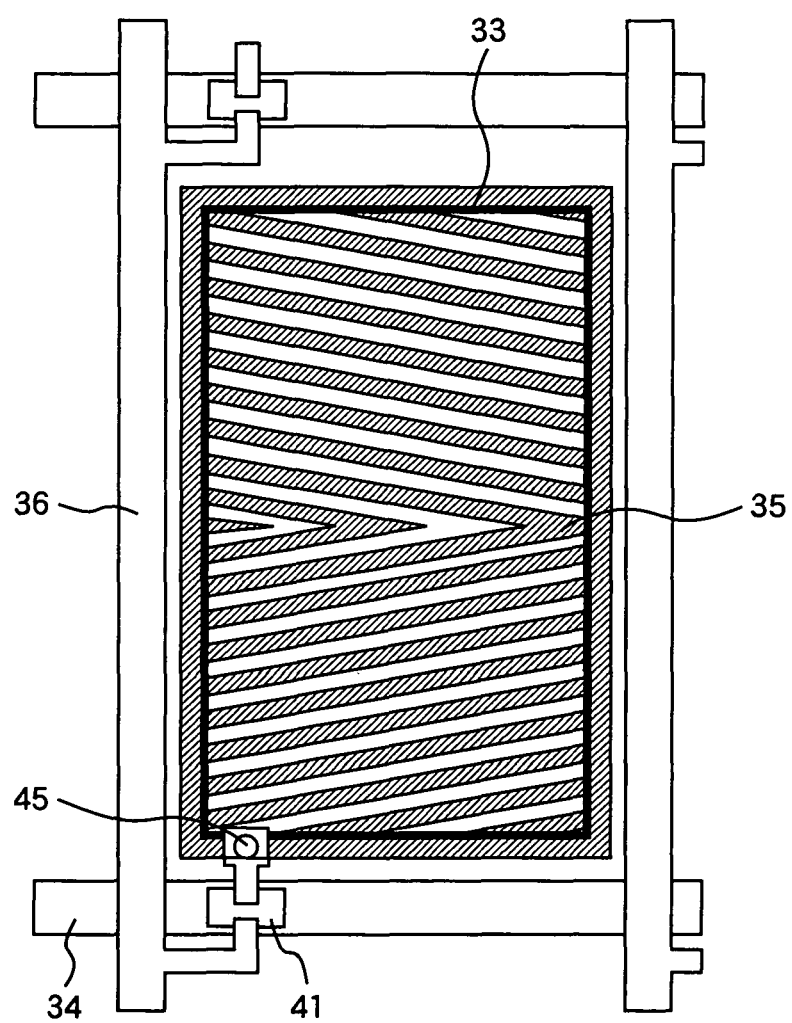
FIG. 13 is a schematic sectional view showing the vicinity of a pixel of an active matrix substrate of the liquid crystal display apparatus as the embodiment of the present invention.
Figure 14:
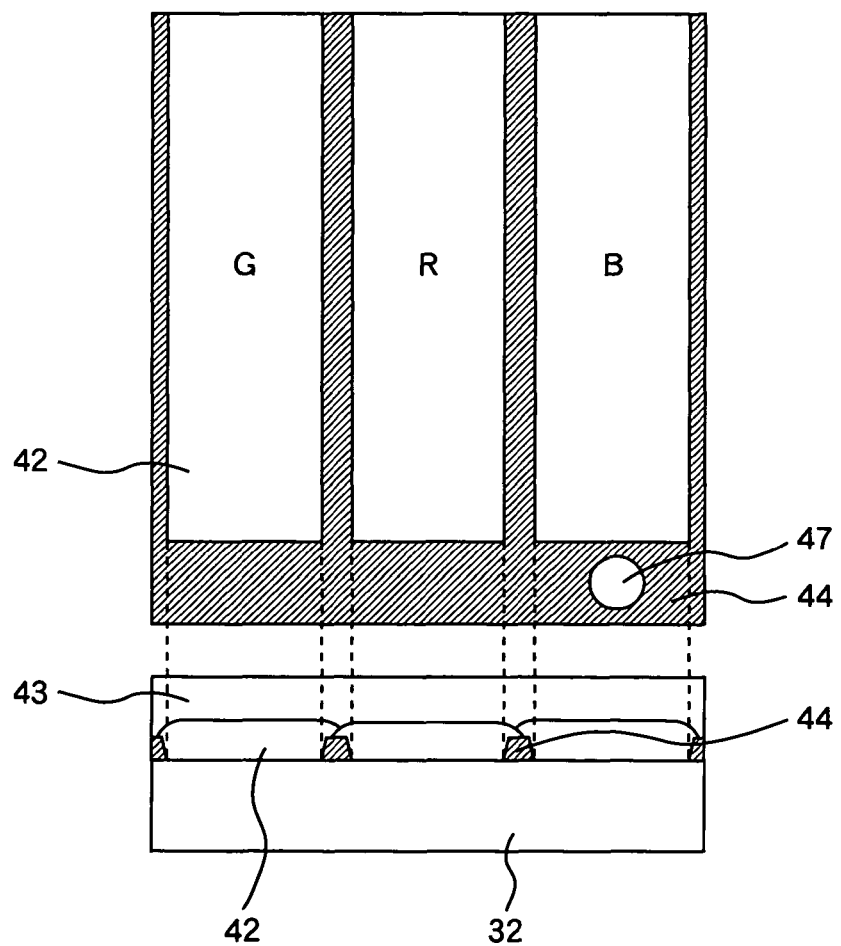
FIG. 14 is a schematic sectional view showing the vicinity of a pixel of a color filter of the liquid crystal display apparatus as the embodiment of the present invention.

The production of a liquid crystal display apparatus according to a second embodiment of the present invention will be illustrated with reference to FIG. 3, and 11 to 14. FIGS. 11 and 12 are a schematic sectional view and an enlarged view thereof, respectively, of the vicinity of a pixel of the liquid crystal display apparatus according to the present invention. FIGS. 13 and 14 are schematic views of the vicinity of a pixel of an active matrix substrate and the vicinity of a picture element (comprising pixels of three primary colors, i.e., R, G, and B pixels in Embodiment 2) of a color filter, respectively, of the liquid crystal display apparatus according to Embodiment 2 of the present invention.

A common electrode 33 comprising indium tin oxide (ITO) was arranged adjacent to a substrate 31 as an active matrix substrate. A scanning electrode (gate electrode) 34 comprising molybdenum/aluminum (Mo/Al) and a common electrode interconnection (common interconnection) 46 are arranged so as to overlap with the ITO common electrode 33. A gate dielectric film 37 comprising silicon nitride is arranged so as to cover the common electrode 33, the gate electrode 34, and the common interconnection 46. A semiconductor layer 41 comprising amorphous silicon or polysilicon is arranged over the scanning electrode 34 with the interposition of the gate dielectric film 37 and acts as an active element as an active layer of a thin-film transistor (TFT). A signal electrode (drain electrode) 36 and a pixel electrode (source electrode) interconnection 48 each comprising chromium/molybdenum (Cr/Mo) are arranged so as to overlap with part of the patterned semiconductor layer 41. A protecting dielectric film 38 comprising silicon nitride is arranged so as to cover all these components.

With reference to FIG. 12, a through hole 45 is arranged through the protecting dielectric film 38; and an ITO pixel electrode (source electrode) 35 is arranged adjacent to the protecting dielectric film 38. The pixel electrode 35 is connected to the metallic (Cr/Mo) pixel electrode (source electrode) interconnection 48 via the through hole 45. With reference to FIG. 13, the ITO common electrode 35 is arranged in a planar manner and the ITO pixel electrode (source electrode) 35 is arranged in a comb form inclined at an angle of about 10 degrees in a region of one pixel, when viewed from above. Thus, an active matrix substrate having 1024×3×768 pixels including 1024×3 (corresponding to R, G, and B) signal electrodes 36 and 768 scanning electrodes 34 was prepared.

Next, a black matrix 44 was formed on the substrate 32 according to a conventional photolithographic procedure including the steps of application, pre-baking, exposure, development, rinsing, and post-baking using a black resist as a product of Tokyo Ohka Kogyo Co., Ltd. The thickness of the black matrix was set at 1.5 μm in Embodiment 2, but it can be set as appropriate according to a black resist to be used, so as to have an optical density (OD) of about 3 or more. Next, color filters were formed according to a conventional photolithographic procedure including the steps of application, pre-baking, exposure, development, rinsing, and post-baking using red, blue, and green resists as products of FUJIFILM Electronic Materials Co., Ltd. In Embodiment 2, the blue, green, and red color filters have thickness of 3.0 μm, 2.8 μm, and 2.7 μm, respectively, but the thickness can be set as appropriate according to desired color purities or the thickness of the liquid crystal layer. According to Embodiment 2, the black matrix was formed so as to surround one pixel, but it can be formed so as to overlie the scanning electrode 34 of the TFT substrate, not formed in a region where different colors overlie each other and formed in a region where adjacent resists of different colors overlie each other, as in Embodiment 1.

Next, an overcoat layer 43 was formed using a product of Nippon Steel Chemical Co., Ltd. under the trade name of V-259 so as to smoothen and protect the color filter layers. The overcoat layer 43 was formed by applying i-ray of a high-pressure mercury lamp at an irradiation energy of 200 mJ/cm$^2$ and heating at 200° C. for thirty minutes. The thickness of the resulting film over a pixel was about 1.2 to 1.5 μm. Next, columnar spacers 47 were formed to a height of about 3.8 μm on the black matrix sandwiched between blue pixels by conventional photolithography and etching using a photosensitive resin. The position of the columnar spacers is not limited to that in Embodiment 2 and can be freely set according to necessity. Instead of the columnar spacers, spherical ball spacers can be selectively arranged typically by printing or ink-jetting. In Embodiment 2, the black matrix is formed in a region overlapping the scanning electrode 34 of the TFT substrate, and spaces between adjacent pixels of different colors are formed so as to allow the adjacent different colors to overlap with each other. However, the black matrix can also be formed in the spaces between adjacent pixels of different colors.

Alignment layers 22 and 23 comprising a dense polyimide film about 100 nm thick were formed by forming a film of polyamic acid varnish on each of the TFT substrate and the color filter substrate by printing, and carrying out a heat treatment at 230° C. for ten minutes. Linearly polarized ultraviolet rays were then applied substantially vertically to the substrates. The polyamic acid varnish comprises, as monomer components, a 6:4 (by mole) diamine mixture of 4,4'-diaminoazobenzene and 4,4'-diaminobenzophenone and a 1:1 (by mole) acid anhydride mixture of pyromellitic anhydride and 1,2,3,4-cyclobutanetetracarboxylic acid dianhydride. Materials for the alignment layers according to this embodiment are not specifically limited, as long as they can impart liquid crystal alignment capability in a direction perpendicular to the plane of the polarization upon the application of linearly polarized ultraviolet rays. In this embodiment, ultraviolet rays at wavelengths of 200 to 400 nm were extracted through an interference filter from a high-pressure mercury lamp as a light source, and were linearly polarized to a polarization ratio of about 10:1 using a pile polarizer comprising an assemblage of quartz substrates. The polarized ultraviolet rays were applied to the substrates at an irradiation energy of about 1.2 J/cm$^2$ at 230° C. The plane of polarization to be applied in this embodiment is the short-side direction of the substrates, namely, the direction of the signal electrode 36 in FIG. 13, because the liquid crystal is initially oriented (namely, oriented before the application of a voltage) in a direction of the scanning electrode 34 in FIG. 13, namely, the horizontal direction of FIG. 13. Photo-sensitive alignment layers were used in Embodiment 2, but alignment layers aligned by rubbing can also be used, as in Embodiment 1.

Next, a liquid crystal display panel to constitute a liquid crystal display apparatus was assembled by arranging the two substrates so that the sides carrying the alignment layers 22 and 23 having liquid crystal alignment capability face each other, and applying a sealing agent to peripheries of the substrates. A nematic liquid crystal composition having a positive dielectric anisotropy of 4.0 at 1 kHz and 20° C. and a refractive anisotropy of 0.10 at 590 nm and 20° C. was filled into the panel in vacuo, and the filling port was sealed by an end-sealing material comprising an ultraviolet-curable resin. A material having a negative dielectric anisotropy of liquid crystal can also be used herein. In this case, the pixel electrode 35 may be formed so that the electric field and the horizontal direction form an angle of 45 degrees or more.

With reference to FIG. 3, an O-polarizer 13 carrying an E-compensator lateral thereto, and another O-polarizer 14 were arranged. The O-polarizers 13 and 14 were each an O-polarizer layer comprising an O-polarizer and triacetylcellulose layers arranged adjacent to both side of the O-polarizer, which O-polarizer was prepared by drawing a poly(vinyl alcohol) dyed with iodine, as in Embodiment 1. The transmission axes of the O-polarizer 13 and the E-compensator 11 were arranged in the short-side direction of the liquid crystal panel, and the transmission axis of the O-polarizer 14 was arranged perpendicular to these axes. Components such as driving circuitry and a light source unit were connected to form a liquid crystal module to thereby yield a liquid crystal display apparatus. The light source unit used three-band fluorescent lamps as a light source. Specifically, twelve fluorescent lamps were arranged in the light source unit, and three layers comprising a diffusing film, a diffuser, and a diffusing film were arranged adjacent to the light source. The configuration of the light source unit is not limited to the configuration shown in Embodiment 2. For example, light emitting diodes (LEDs) and flat light sources can be used as a light source. Instead of or in addition to diffusers, condenser sheets and sheets comprising polarization-conversion layer for improving optical availability can be used.

The E-compensator was formed by sulfonating a polycyclic compound such as an indathrone derivative, a dibenzimidazole derivative of perylenetetracarboxylic acid, or a naphthalenetetracarboxylic acid derivative to yield a lyomesophase exhibiting a chromonic phase, applying the lyomesophase using shear strength, drying, desulfonating the film with barium chloride, and insolubilizing the film. The E-compensator had a thickness after drying of 80 nm and a transmittance of 85%.

Figure 15:
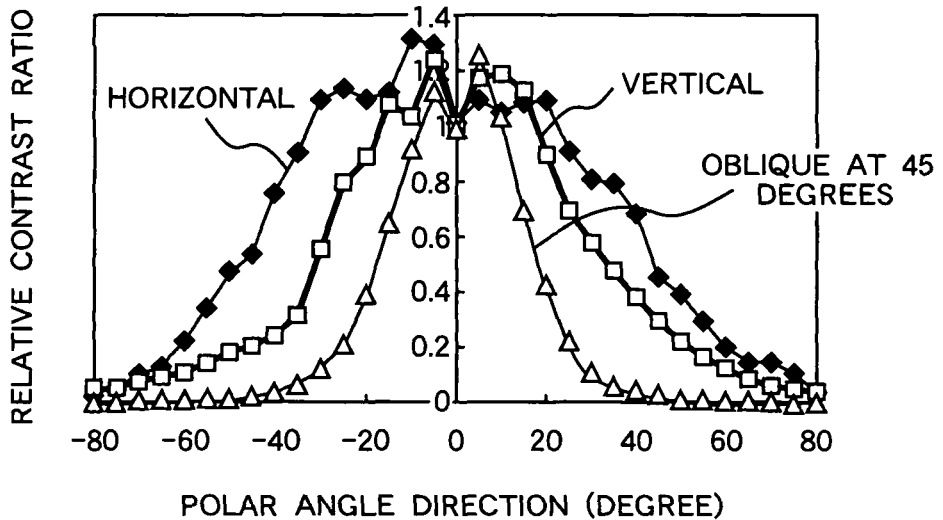
FIG. 15 shows the viewing angle characteristic in contrast ratio of the liquid crystal display apparatus as the embodiment of the present invention.
Figure 16:
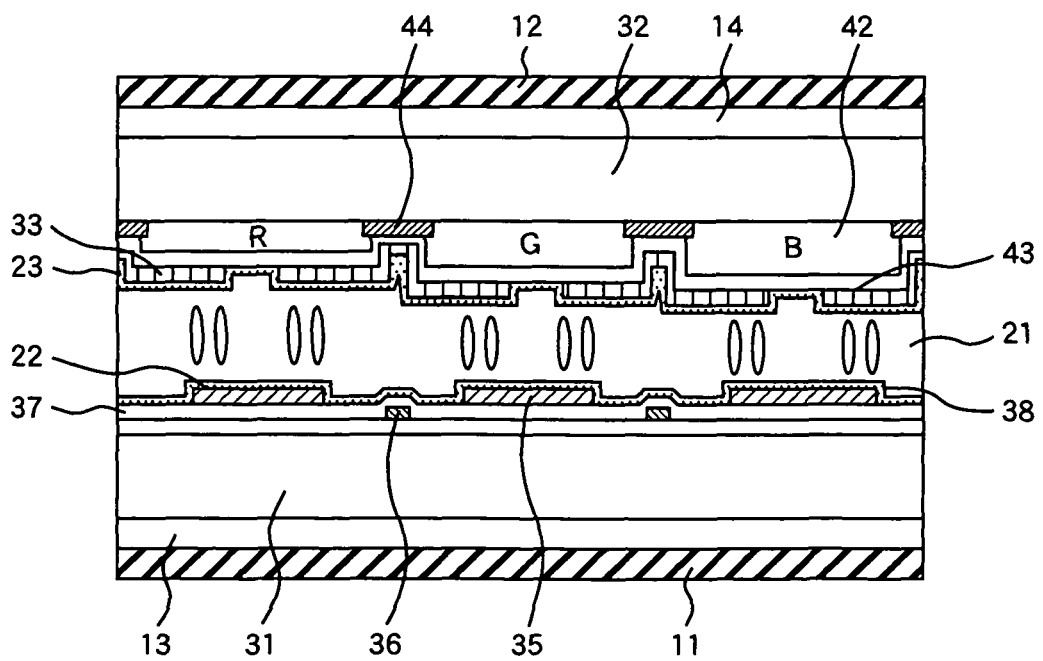
FIG. 16 is a schematic sectional view showing the vicinity of a pixel of a liquid crystal display apparatus as yet another embodiment of the present invention.

FIG. 15 shows the viewing angle characteristic in relative contrast ratio of the liquid crystal display apparatus according to Embodiment 2, showing how the front contrast ratio varies depending on the viewing angle. The "VERTICAL" is a short-side direction, and the "HORIZONTAL" is a long-side direction of the liquid crystal panel. The "OBLIQUE AT 45 DEGREES" is a direction at an angle of 45 degrees wherein the horizontal right-hand direction viewed from the viewer is defined at 0 degree. Accordingly, directions at negative angles with respect to the polar angle are directions from 0 degree to 225 degrees. FIG. 15 demonstrates that the viewing angle characteristic is improved in the vertical direction as compared with the results of the comparative example shown in FIG. 10. Specifically, the viewing angle characteristic is improved in the direction of the absorption axis of the E-compensator. The liquid crystal display apparatus according to Embodiment 2 had an absolute value of the front contrast ratio of 880. It also realized very satisfactory viewing angle characteristic in a black display without coloring.

The E-compensator according to Embodiment 2 was formed adjacent to the diffuser. However, such an E-compensator can be arranged adjacent to a protector comprising glass or an acrylic resin, if formed on the uppermost surface of the liquid crystal panel. Specifically, the E-compensator can be arranged adjacent to the uppermost surface of the protector or inside the protector. In the latter case, an antireflection coating is preferably formed as an uppermost layer of the protector so as to reduce the influence of external light.

The advantages of the E-compensator for compensation of viewing angle according to the present invention are not affected by the configuration and shape of liquid crystal display apparatuses, and the configuration is not limited to that of the liquid crystal display apparatus according to Embodiment 2.

Embodiment 3

According to Embodiment 3, E-compensators 11 and 12 were arranged external to O-polarizers 13 and 14 of a patterned vertical alignment (PVA) liquid crystal display apparatus.

On a substrate 32 having a thickness of 0.7 mm as a color filter substrate, a black matrix was formed by forming a chromium film to a thickness of 160 nm and a chromium oxide film to a thickness of 40 nm by continuous sputtering, applying a positive resist, and carrying out the steps of pre-baking, exposure, development, etching, stripping, and rinsing. Next, color filters were formed according to a conventional photolithographic procedure including the steps of application, pre-baking, exposure, development, rinsing, and post-baking using red, blue, and green resists as products of FUJIFILM Electronic Materials Co., Ltd. In Embodiment 3, the blue, green, and red color filters have thickness of 3.0 μm, 2.7 μm, and 2.5 μm, respectively, but the thickness can be set as appropriate according to desired color purities or the thickness of the liquid crystal layer.

Next, an overcoat layer 43 was formed using a product of Nippon Steel Chemical Co., Ltd. under the trade name of V-259. The overcoat layer 43 was formed by applying i-ray of a high-pressure mercury lamp at an irradiation energy of 200 mJ/cm$^2$ and heating at 230° C. for thirty minutes. The thickness of the resulting film over a pixel was about 1.2 to 1.5 μm. The overcoat layer was formed on the color filter layers in Embodiment 3, but the overcoat layer is not necessarily formed, and an ITO film can be formed directly on the color filter layers by sputtering.

Next, a common electrode 33 was patterned by carrying out vapor deposition of ITO by sputtering to a thickness of 140 nm, crystallizing the film by heating at 240° C. for ninety minutes, and carrying out photolithography and etching. The common electrode 33 had openings between which an opening of the pixel electrode 35 was arranged. Next, columnar spacers were formed to a height of about 3.5 μm on the black matrix sandwiched between blue pixels by conventional photolithography and etching using a photo-sensitive resin.

A scanning electrode (gate electrode) 34 (not shown) comprising molybdenum/aluminum (Mo/Al) was formed on a substrate 31 having a thickness of 0.7 mm as an active matrix substrate. In the same layer, a storage capacitor electrode (not shown) may be formed from chromium and/or aluminum. A gate dielectric film 37 was formed so as to cover these components, and a signal electrode (drain electrode) 36 and a thin-film transistor (not shown) were formed by the procedure of Embodiment 1. A protecting dielectric film 38 was formed so as to cover these components, and a pixel electrode 35 having an opening pattern was formed from ITO on the protecting dielectric film 38. A transparent conductor such as IZO can be used as the pixel electrode 35. Thus, an active matrix substrate having 1024×3×768 pixels including 1024×3 (corresponding to R, G, and B) signal electrodes 36 and 768 scanning electrodes 34 was prepared.

Alignment layers 22 and 23 were formed on the TFT substrate and the color filter substrate, respectively. A sealing agent was applied to the peripheries of the substrate, and a liquid crystal material having a negative dielectric anisotropy was filed into a filling port according to a one-drop-fill (ODF) method. Thus, a liquid crystal panel was assembled.

E-compensators 11 and 12 were formed external to the O-polarizers 13 and 14, respectively, by the procedure of Embodiment 1. The E-compensator 11 external to the O-polarizer 13 had a thickness of 70 nm, and the E-compensator 12 external to the O-polarizer 14 had a thickness of 100 nm. These E-compensators had transmittances of 91% and 81%, respectively. The transmission axes of the O-polarizer 13 and the E-compensator 11 in proximity to the light source were arranged in the long-side direction of the substrates, and those of the O-polarizer 14 and the E-compensator 12 were arranged in the short-side direction of the substrates. Namely, the former axes were perpendicular to the later axes. The O-polarizer 14 used herein was a viewing angle compensation polarizer having a birefringent film for compensating viewing angle characteristics derived from the alignment of liquid crystal molecules. Components such as driving circuitry and a light source unit were connected to form a liquid crystal module to thereby yield a liquid crystal display apparatus.

The displaying properties of the liquid crystal display apparatus were determined to find that it had improved viewing angle characteristics both in the horizontal and vertical directions and had an improved front contrast ratio of 1000.

A PVA liquid crystal display apparatus using a notched patterned ITO was used in Embodiment 3. In the case of a multi-domain vertical alignment (MVA) liquid crystal display apparatus in which ribs are arranged on a color filter substrate, the production further comprises the step of forming ribs after the formation of ITO and before the formation of columnar spacers. The E-compensators are arranged adjacent to the O-polarizers in Embodiment 3, but they can be arranged adjacent to diffusers, as in Embodiment 1.

Embodiment 4

Figure 17:
FIG. 17 is a schematic sectional view showing the vicinity of a pixel of a liquid crystal display apparatus as still another embodiment of the present invention.

A liquid crystal display apparatus according to Embodiment 4 has the same configuration as in Embodiment 2, except for the position of an E-compensator. Specifically, an E-compensator 12 was formed adjacent to an overcoat layer 43 as illustrated in FIG. 17. The E-compensator was formed by sulfonating a polycyclic compound such as an indathrone derivative, a dibenzimidazole derivative of perylenetetracarboxylic acid, or a naphthalenetetracarboxylic acid derivative to yield a lyomesophase exhibiting a chromonic phase, applying the lyomesophase using shear strength, drying, desulfonating the film with barium chloride, and insolubilizing the film. The E-compensator had a thickness after drying of 60 nm and a transmittance of about 92%. The transmission axis of the E-compensator 12 was arranged in substantial parallel with the transmission axis of the O-polarizer 13, namely, a direction of the short side of the liquid crystal panel.

Figure 18:
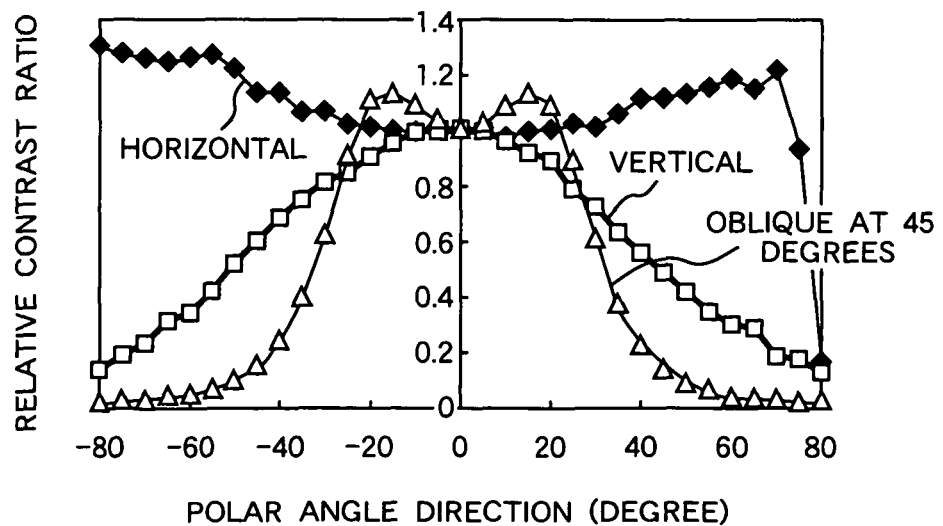
FIG. 18 shows the viewing angle characteristic in contrast ratio of the liquid crystal display apparatus as an embodiment of the present invention.

FIG. 18 shows the viewing angle characteristic in relative contrast ratio of the liquid crystal display apparatus according to Embodiment 4. FIG. 18 demonstrates that the liquid crystal display apparatus has a dramatically improved viewing angle characteristic in the horizontal direction and an improved viewing angle characteristic in the oblique direction at an angle of 45 degrees. The E-compensator was arranged inside (in proximity to the liquid crystal layer) of the liquid crystal panel according to Embodiment 4, but it is also acceptable that the E-compensator is formed adjacent to the substrate 32 by coating, the O-polarizer 13 is attached to the E-compensator.

The advantages of E-compensator for compensating viewing angle characteristics according to the present invention are not affected by the configuration and shape of liquid crystal display apparatuses, and the configuration is not limited to that of the liquid crystal display apparatus according to Embodiment 4.

Embodiment 5

A liquid crystal panel according to Embodiment 5 has the same configuration as that of Embodiment 1, except for the thickness and transmission axis of an E-compensator. Specifically, an E-compensator 11 was formed on a diffuser 17 so as to have a transmission axis in substantial parallel with the absorption axis of an O-polarizer 14, namely, the short-side direction of the liquid crystal panel. The E-compensator 11 had a thickness of 50 nm and a transmittance of about 93%.

Figure 19:
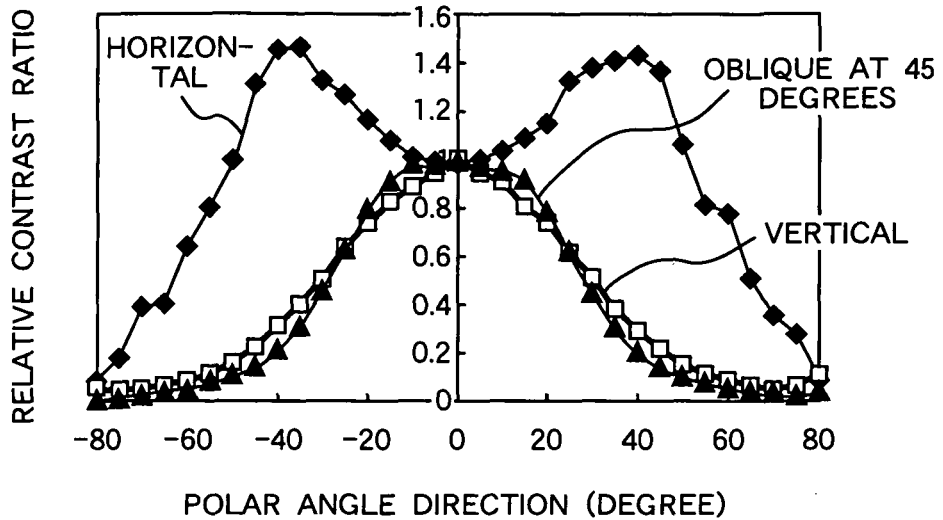
FIG. 19 shows the viewing angle characteristic in contrast ratio of the liquid crystal display apparatus as another embodiment of the present invention.

FIG. 19 shows the viewing angle characteristics in relative contrast ratio of the liquid crystal display apparatus according to Embodiment 5. FIG. 19 demonstrates that the liquid crystal display apparatus has significantly improved viewing angle characteristics in the horizontal direction and the oblique direction at an angle of 45 degrees. The E-compensator may be arranged adjacent to the O-polarizer 14.

The advantages of the E-compensator for compensating viewing angle characteristics according to the present invention are not affected by the configuration and shape of liquid crystal display apparatuses, and the configuration is not limited to that of the liquid crystal display apparatus according to Embodiment 5.

Embodiment 6

A liquid crystal panel according to Embodiment 6 has the same configuration as that of Embodiment 2, except for the thickness and transmission axis of an E-compensator. Specifically, an E-compensator 11 was formed on an O-polarizer 13 so as to have a transmission axis in substantial parallel with the absorption axis of the O-polarizer 13, namely, the long-side direction of the liquid crystal panel. The E-compensator 11 had a thickness of 35 nm and a transmittance of about 95%.

Figure 20:
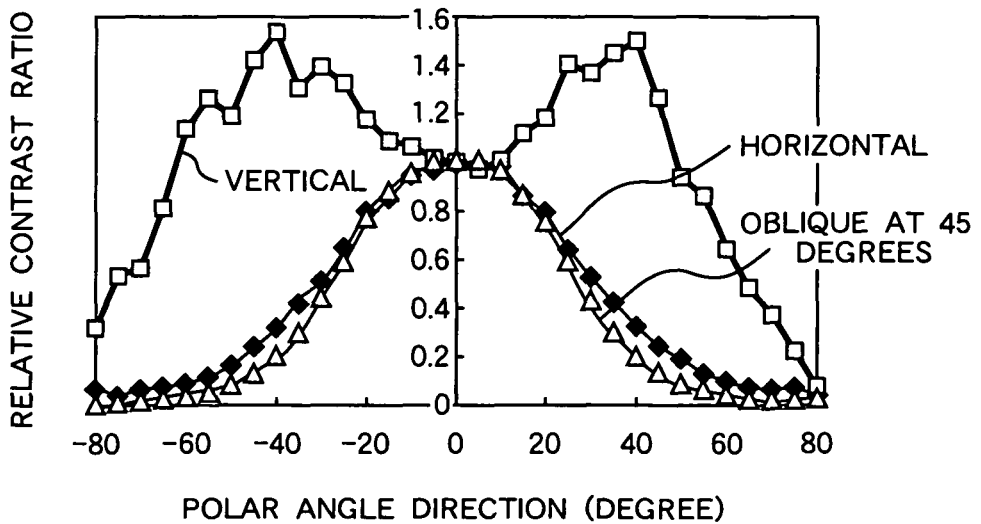
FIG. 20 shows the viewing angle characteristic in contrast ratio of the liquid crystal display apparatus as yet another embodiment of the present invention.

FIG. 20 shows the viewing angle characteristics in relative contrast ratio of the liquid crystal display apparatus according to Embodiment 6. FIG. 20 demonstrates that the liquid crystal display apparatus has significantly improved viewing angle characteristics in the vertical direction and the oblique direction at an angle of 45 degrees. The same advantages can be obtained when the E-compensator is arranged adjacent to a protector such as glass or an acrylic plate which may be arranged adjacent to the front of the liquid crystal panel.

The advantages of the E-compensator for compensating the viewing angle characteristics according to the present invention are not affected by the configuration and shape of liquid crystal display apparatuses, and the configuration is not limited to that of the liquid crystal display apparatus according to Embodiment 6.

As is described above, the present invention can be generally applied to liquid crystal display apparatuses.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid crystal display apparatus comprising:
   a pair of substrates;
   a pair of O-type polarizers arranged to sandwich the pair of substrates, respectively;
   a liquid crystal layer held between the pair of substrates;
   an E-compensator, having a transmittance from 81% to 85%, disposed adjacently to one of the substrates, the E-compensator being located between of the pair of O-type polarizers;
   a light source unit arranged externally to the pair of the O-type polarizers; and
   a group of electrodes being disposed to at least one of the pair of substrates and serving to apply an electric field to the liquid crystal layer,
   wherein each of the pair of O-type polarizers includes an absorption axis along with an extraordinary wave axis of molecules constituting the O-type polarizers,
   wherein the E-compensator is formed on at least one of the pair of substrates and wherein the E-compensator contains a dichroic dye having a disc-form molecular structure, the E-compensator having a transmission axis aligned with the extraordinary wave axis of molecules, and
   wherein the transmission axis of the E-compensator substantially in parallel with a transmission axis of one of the pair of O-type polarizers in proximity to the dye contained in the E-compensator,
   wherein the E-type compensator is made of a dichroic dye,
   wherein a thickness of the E-type compensator is from 50 nm to 80 nm,
   wherein the E-type compensator is disposed on a side adjacent to the light source unit.

2. The liquid crystal display apparatus of claim 1, wherein the E-compensator is disposed to one of the pair of O-type polarizers.

3. The liquid crystal display apparatus of claim 1,
   wherein a color filter layer is formed on one of the pair of substrates, and
   wherein the E-compensator is arranged between the color filter layer and the liquid crystal layer.

4. The liquid crystal display apparatus of claim 1, wherein the pair of O-type polarizers and the E-compensator are disposed outside of the substrates.

5. The liquid crystal display apparatus of claim 1, wherein the dichroic dye is made of a lyotropic liquid crystalline dichroic dye.

* * * * *